US009573314B2

(12) United States Patent
Chauvin et al.

(10) Patent No.: US 9,573,314 B2
(45) Date of Patent: Feb. 21, 2017

(54) METHOD AND APPARATUS FOR PACKAGING A LIQUID FOOD PRODUCT

(75) Inventors: Guillaume Chauvin, Monthureux sur Saone (FR); Fabio Chimetto, Piazzola Sul Brenta (IT); Klaus Hartwig, Nancy (FR)

(73) Assignee: DISCMA AG, Hunenberg (CH)

( * ) Notice: Subject to any disclaimer, the term of this patent is extended or adjusted under 35 U.S.C. 154(b) by 1216 days.

(21) Appl. No.: 13/002,199

(22) PCT Filed: Jul. 1, 2009

(86) PCT No.: PCT/EP2009/058236
§ 371 (c)(1),
(2), (4) Date: Feb. 9, 2011

(87) PCT Pub. No.: WO2010/003853
PCT Pub. Date: Jan. 14, 2010

(65) Prior Publication Data
US 2011/0268855 A1   Nov. 3, 2011

(30) Foreign Application Priority Data

Jul. 7, 2008   (EP) .................................. 08159852

(51) Int. Cl.
*B29C 49/46* (2006.01)
*B29C 49/06* (2006.01)
(Continued)

(52) U.S. Cl.
CPC .............. *B29C 49/46* (2013.01); *B29C 49/06* (2013.01); *B29C 49/12* (2013.01); *B29C 49/78* (2013.01);
(Continued)

(58) Field of Classification Search
CPC ...................................................... B29C 49/46
(Continued)

(56) References Cited

U.S. PATENT DOCUMENTS 7,473,388 B2    1/2009  Desanaux et al.
2008/0029928 A1* 2/2008  Andison et al. .............. 264/238

FOREIGN PATENT DOCUMENTS

JP          06345191       12/1994
JP        2000043129        2/2000
(Continued)

OTHER PUBLICATIONS

PCT International Search Report for Application No. PCT/EP2009/058236 Mailing Date of Oct. 6, 2009. 4 Pages.

*Primary Examiner* — Larry Thrower
(74) *Attorney, Agent, or Firm* — Eric J. Sosenko; Jonathan P. O'Brien; Honigman Miller Schwartz and Cohn LLP

(57) ABSTRACT

The invention relates to a method of delivering a predetermined volume of beverage into a thermoplastic container formed from a heated preform positioned in a mold, characterized in that the product includes a step of injecting at least some beverage into a recess in the preform so as to promote expansion of the preform inside the mold, the mold defining the shape of the container, a volume of beverage introduced during the injection step being at least equal to said predetermined volume, and, in addition, the method includes a step of sucking out a fraction of said volume of the beverage introduced until the volume of beverage remaining in the container is approximately equal to said predetermined volume.

17 Claims, 4 Drawing Sheets

(51) Int. Cl.
    *B29C 49/12*         (2006.01)
    *B29C 49/78*         (2006.01)
    *B29K 23/00*         (2006.01)
    *B29K 25/00*         (2006.01)
    *B29K 27/06*         (2006.01)
    *B29K 67/00*         (2006.01)
    *B29K 69/00*         (2006.01)
    *B65B 3/02*          (2006.01)

(52) U.S. Cl.
    CPC ............... *B29C 2049/1257* (2013.01); *B29C 2049/1271* (2013.01); *B29C 2049/4655* (2013.01); *B29C 2049/4664* (2013.01); *B29K 2023/06* (2013.01); *B29K 2023/12* (2013.01); *B29K 2025/00* (2013.01); *B29K 2027/06* (2013.01); *B29K 2067/00* (2013.01); *B29K 2067/046* (2013.01); *B29K 2069/00* (2013.01); *B65B 3/022* (2013.01)

(58) Field of Classification Search
    USPC ........................................................ 264/524
    See application file for complete search history.

(56)               References Cited

FOREIGN PATENT DOCUMENTS

| WO | 2005044540 | 5/2005 |
| WO | 2006096916 | 9/2006 |
| WO | 2007120807 | 10/2007 |

\* cited by examiner

METHOD AND APPARATUS FOR PACKAGING A LIQUID FOOD PRODUCT

The present invention relates to the field of manufacturing containers made of a polymer material, especially a polyester. More particularly, it relates to the field of manufacturing polyester bottles, preferably polyethylene terephthalate (PET) bottles containing a liquid, preferably water and especially mineral water.

For many years, the PET bottles usually found on the market have been manufactured by the blow moulding or stretch-blow moulding of PET preforms using compressed air.

A preform usually takes the form of a cylindrical tube closed at one of its ends and open at its opposite end. The open head of the preform corresponds to the neck of the container. During the conventional process for manufacturing containers from preforms, the preforms are slipped onto the cylindrical mounts of a continuous conveyor chain, which thus transports the preforms through an oven, essentially formed by a straight section bordered on each side by radiative heating means, so as to temperature-condition the plastic for the subsequent stretch-blow moulding step.

The hot preform is then taken off and transported into a mould of a blow moulding machine. The transport movement, performed for example by a transfer arm, is coordinated with that of the blow moulding machine, which is generally produced in the form of a rotary carousel that rotates continuously about its vertical axis and carries, on its periphery, a series of identical moulds. Thus, the preform is placed in the mould immediately after it has been opened and the previously formed container has been removed.

The preform is heated beforehand so as to be in the mould at a temperature above the glass transition temperature (about 100° C.) so as to enable it to be formed by stretch-blow moulding. The temperature of the preform at the end of the heating step is slightly above that required inside the mould of the blow moulding machine, so as to take into account the cooling that takes place over the distance that exists between the heating site and the blow-moulding site. Thanks to the simultaneous presence of several moulds, such a blow moulding machine can produce containers at very high rates, of around 1000 to 2000 bottles per hour per mould, i.e. around several tens of thousands of units per hour.

The stretch-blow moulding takes place by stretching using a metal rod and by injecting air at pressures ranging from 3 to 40 bar ($3 \cdot 10^5$ Pa to $4 \cdot 10^6$ Pa). The air is injected through a nozzle, the end of which is introduced through the opening in the head of the preform.

In general, the pressures then exerted on the injected beverage are high, since the industrial process requires high rates. The usual practice is for the volume of beverage introduced into the containers to be above the displayed volume for the container, in so far as it is possible to finalize the contents with a volume greater than the stipulated volume, whereas the reverse is not possible.

However, such a situation is hardly satisfactory as there is consequently a loss of food product for the manufacturer, and also a lack of precision in the match between the contained volume value and the reality of this volume, bottle by bottle.

Within this context, the technical problem solved by the present invention is to devise an industrial process that guarantees the stipulated volume for the type of filling, in a simple and economically acceptable manner.

For this purpose, the Applicant proposes a method of delivering a predetermined volume of a beverage component into a thermoplastic container formed from a heated preform (for example an approximately cylindrical preform) positioned in a mould, the method including a step of injecting at least some beverage component into a recess in the preform so as to promote expansion of the preform inside the mould, the mould defining the shape of the container, a volume of beverage component introduced during the injection step being at least equal to said predetermined volume, and, in addition, the method includes a step of sucking out a fraction of said volume of beverage component introduced until the volume of beverage component remaining in the container is approximately equal to said predetermined volume.

The method thus defined makes it possible to guarantee the intended volume for the type of container defined by the mould within the context of an integrated industrial process.

The suction step is preferably carried out by means of a suction pump and a volumetric sensor. The injection step is preferably carried out by means of a pressurizing actuator and a volumetric sensor.

Preferably, the injection step includes a substep of longitudinally stretching the preform by a stretch rod, said stretch rod being hollow, and the suction step comprises sucking out some of the beverage via said hollow stretch rod.

This has the advantage that the method is implemented in an integrated manner.

Advantageously, the method includes a step of recirculating at least part of the beverage sucked out during the suction step.

The recirculation may be performed in the injection circuit, thereby minimizing beverage losses.

According to one embodiment, provision is also made for the suction step to comprise suction by means of a vacuum pump.

Advantageously, the injection step includes a substep of injecting at least some beverage via a hollow stretch rod that is designed to stretch a thermoplastic preform and is connected to a beverage inlet.

According to a preferred feature, the same stretch rod serves for injecting beverage and for sucking out a fraction of said volume of beverage.

According to one feature, which may be combined with the previous ones, the hollow stretch rod has an adapted profile in order to minimize the turbulence in the beverage during the step of injecting at least some beverage via the hollowing stretch rod.

Said profile may include an internal profile, an external profile or a combination of an internal profile and an external profile. A person skilled in the art will appreciate that the characteristics of the surfaces are adapted, and they prevent the formation of turbulence.

The beverage is injected in amounts of about 500 ml in 0.2 s. The adapted profile minimizes the turbulence, thereby making it possible to obtain a more stable process, with wider operational windows.

Preferably, the injection is carried out by means of a bell-shaped filling head.

This makes it possible to reduce the risks of the thermoplastic container necks rupturing, since they are subjected to high pressures during the injection step.

According to one advantageous aspect, the stretch rod is designed in such a way that its internal volume is optimized so that said fraction of the beverage volume is reduced.

Preferably, the fraction of the beverage volume is reduced to the internal volume of the neck.

According to one embodiment, the injection step includes a step of injecting at least some beverage through the inside of the stretch rod and through an orifice around the stretch rod.

Indeed, it is also advantageous for the injection step to comprise a step of injecting a first beverage component and a step of injecting a second beverage component. Under these circumstances, which have a particular advantage from the industrial standpoint, it is only in the bottle that the final preparation of the beverage can take place.

Most particularly advantageous is the solution whereby the injection of the first beverage component comprises injection through the inside of the stretch rod and the injection of the second beverage component comprises injection through an orifice around the stretch rod.

The invention also relates to a device for delivering a predetermined volume of beverage into a thermoplastic container formed from an approximately cylindrical heated preform positioned in a mould, characterized in that the device comprises means for injecting at least some beverage into a recess in the preform so as to promote expansion of the preform inside the mould, the mould defining the shape of the container, a volume of beverage introduced during the injection step being at least equal to said predetermined volume and the device comprising, in addition, means for sucking out a fraction of said volume of beverage component introduced until the volume of beverage remaining in the container is approximately equal to said predetermined volume.

Advantageously, this device may include means suitable for carrying out the respective intended steps of the method, taken separately or in combination.

The invention will now be described in detail with reference to the appended figures, which relate to exemplary embodiments.

The embodiment given here by way of example relates to a process for manufacturing PET mineral water bottles from a heated preform. The preform has the shape of a cylindrical tube closed at its lower end. The open head of the preform corresponds to the throat or neck of the bottle, onto which a closure cap is screwed.

Figure 1:
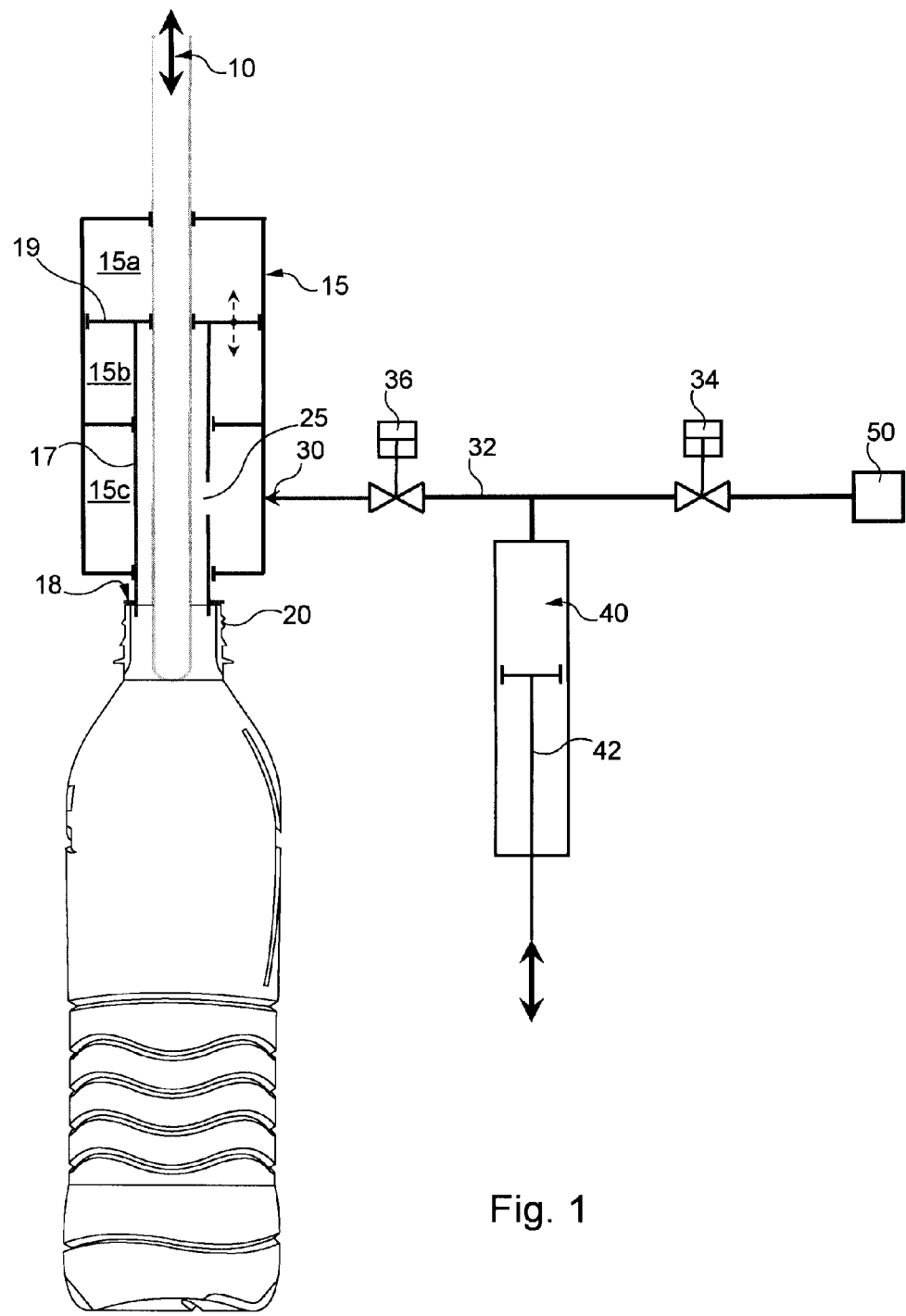
FIG. 1 shows a general diagram of an installation suitable for operating with the invention.

Referring to FIG. 1, a stretch rod 10 is inserted into a compressed-air actuator 15. The stretch rod 10 is generally controlled by an air actuator associated with a cam, which gives it a longitudinal movement (represented by an arrow). It is also possible to use a stretch motor.

The compressed-air actuator 15 comprises a cylinder 17 controlling an injection head 18, through which the stretch rod 10 passes. The injection head 18 is connected to the neck 20 of a PET preform placed in a mould (not shown), which preform, after being expanded, takes on the shape of a mineral water bottle, this shape being determined by the wall of the mould.

The actuator comprises three chambers, the upper two chambers 15a and 15b being filled with compressed air. Between these upper two chambers, a piston wall 19 slides in a direction parallel to the stretch rod (the displacement being represented by an arrow). The stretch rod 10 passes through the centre of this wall 19.

The compressed-air actuator also includes a lateral inlet 30 for the beverage, here mineral water, connected to the third chamber 15c of the actuator, this being the bottom chamber. The beverage is fed in via a line 32.

An external mineral water inlet feeds the liquid via the remote end of this line 32 into a first valve 34, which is connected to the opening of a single-chamber filling cylinder 40 comprising a piston 42 controlled by a filling motor (movement of which is represented by an arrow). This motor imparts a longitudinal movement on the piston in the single chamber of the filling cylinder 40.

On the line 32 there is a second valve 36, which is in series behind the first valve 34 and the opening of the filling cylinder 40. The line 32 then runs into the bottom chamber 15c of the compressed-air actuator 15.

The bottom chamber 15c of the compressed-air actuator is penetrated by the cylinder 17 for controlling the filling head 18, the internal volume of which emerges through the lower outlet of the compressed-air actuator 15 into the filling head 18. The control cylinder has a lateral opening 25 allowing the beverage to circulate between the bottom chamber of the actuator and the inside of the control cylinder.

The stretch rod 10 itself passes through the control cylinder 17 as far as the filling head 18 and the neck 20 of the bottle preform.

Figure 2:
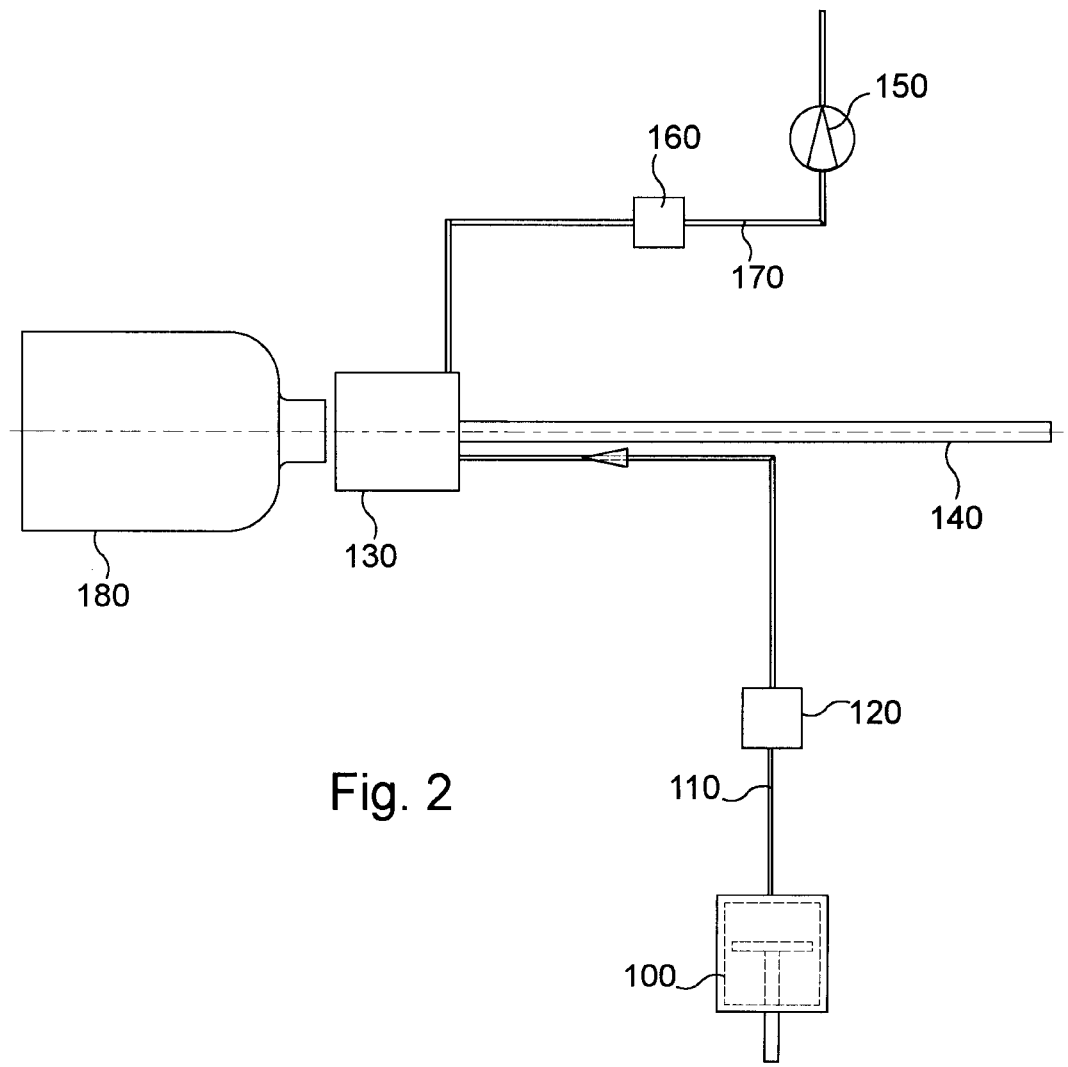
FIG. 2 shows an important aspect of the invention.

Referring to FIG. 2, showing an alternative embodiment, a pressurizing actuator 100 increases the pressure of the beverage in the beverage feed line 110. A volumetric sensor 120 allows the volume injected through the line 110 to be monitored. The beverage is introduced into the nozzle 130.

The stretch rod 140 is introduced along the axis of the nozzle 130.

A suction pump 150 is attached to a line 170 connected via a volumetric sensor to the nozzle 130.

The nozzle 130 is positioned facing the mould (not shown) in which the PET preform, to be expanded and filled with beverage, here mineral water, is positioned. After the expansion phase, a PET water bottle 180 is formed.

Figure 3:
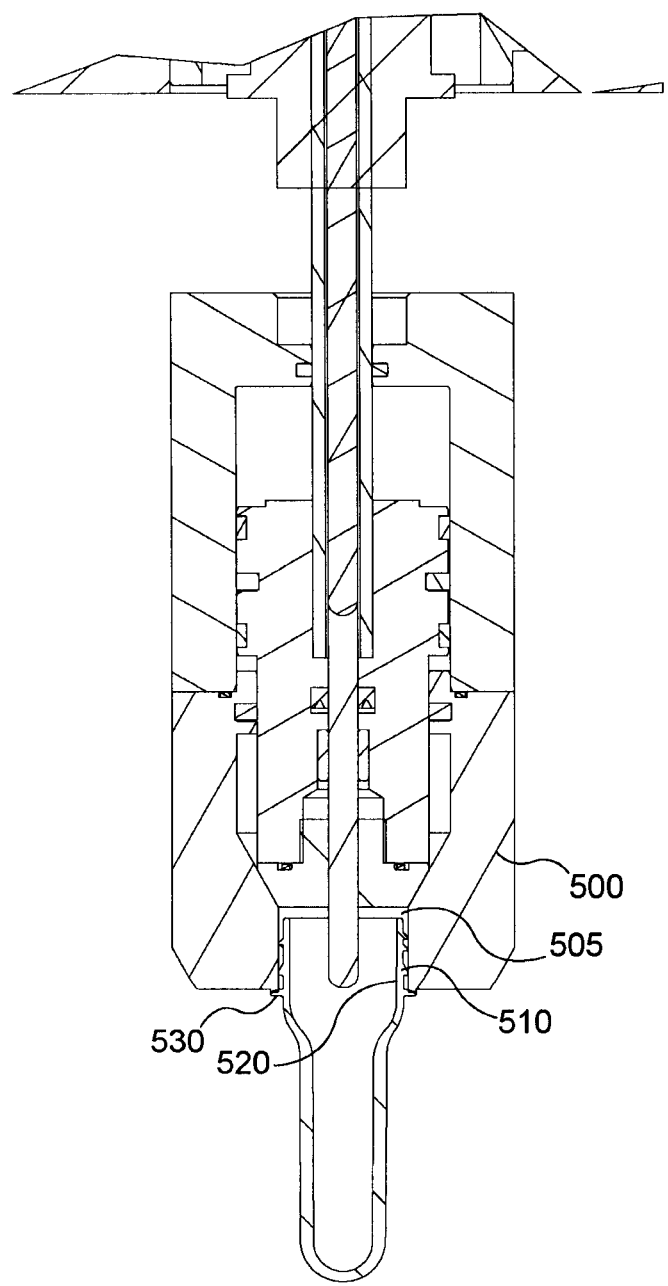
FIG. 3 shows a bell-shaped nozzle end-piece used within the context of the invention.

Referring to FIG. 3, a bell-shaped nozzle end-piece 500 according to a preferred embodiment is shown. The internal and external pressures on either side of the circumference of the neck of the preform (i.e. on the external surfaces 510 of the neck and on the internal surfaces 520 of the neck) are identical, owing to the presence of a passage 505 connecting the volumes on either side of the circumference, inside the nozzle. During filling, sealing is provided by the flange 530 on the preform. Thanks to this device, there is no risk of the neck of the preform deforming while a pressurized fluid is being injected by the nozzle.

According to another embodiment, a nozzle end-piece holds the external surfaces 510 of the neck of the preform in such a way that when a pressurized fluid is injected via the top of the nozzle into the recess of the preform, the pressure exerted on the internal walls 520 of the neck of the preform by the fluid is compensated for by the holding by the walls of the bell-shaped nozzle end-piece. The neck of the preform therefore does not deform, despite the high pressure.

Figure 4:
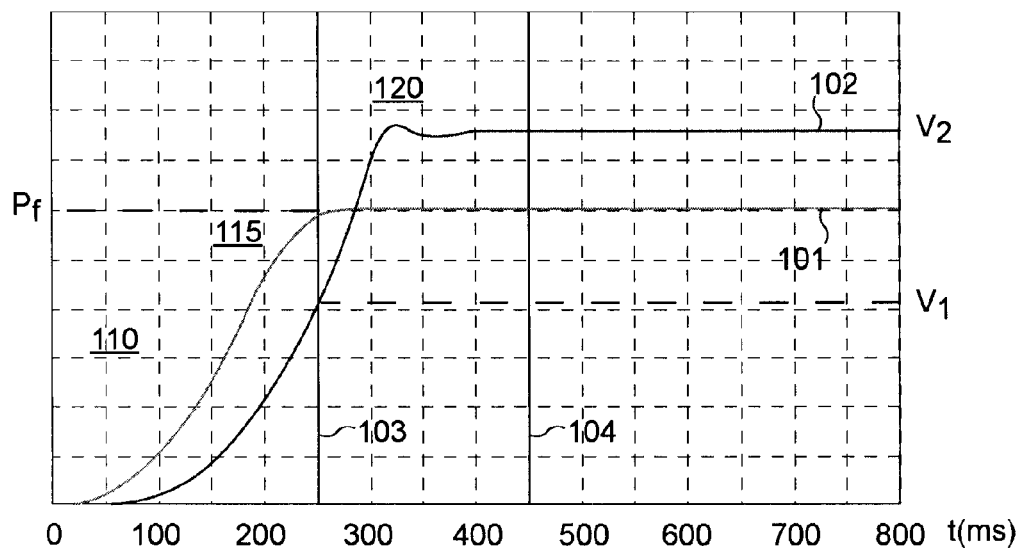
FIG. 4 shows the monitoring of the formation of a mineral water bottle according to one example of the use of the invention.

FIG. 4 shows the variation over time of the position 101 of the stretch rod and the position 102 of the filling actuator controlling the inflow of the mineral water into the expanded preform.

The horizontal axis represents the time, the left-hand vertical axis represents the position of the stretch rod and the right-hand vertical axis represents the volume of water introduced into the expanded preform, this being proportional to the position of the filling actuator.

During a first part of the process, from 0 to 250 ms, the stretch rod advances at an essentially constant rate, according to a preferred embodiment.

However, according to another embodiment, during a first phase 110 of the process, in particular from 0 to 150 ms, the stretch rod advances at an increasing speed due to a positive acceleration. During a second phase 115 of the process, from 150 ms to 250 ms, the stretch rod advances with a negative acceleration, the speed decreasing until it becomes zero at 250 ms. However, it will be understood that the changes in speed must be sufficiently gentle to ensure regular and reliable stretching of the thermoplastic.

250 ms after the start of the process (reference 103), the stretch rod has reached its final position $P_f$, from which it no longer moves.

At the same instant, the filling actuator has introduced a volume $V_1$ of mineral water into the expanded preform. The volume introduced from the start of the process (therefore between 0 ms and 250 ms) has progressively increased, with a progressive increase in the flow rate (filling actuator displacement acceleration).

During the moments that follow, which constitute a third phase 120 of the process, up to 320 ms, the total volume of water introduced is constant, the flow rate being invariant. Next, the volume suddenly decreases by a small fraction (around 4%) over a period of 40 ms.

From this instant on, the total volume introduced stabilizes around the value $V_2$, which is finally reached after a few oscillations, the flow rate of liquid being introduced being zero.

A few instants later, starting from 450 ms after the start of the process (reference 104), the filling actuator has reached a final position, from which it no longer moves. At this moment, it has introduced a volume $V_2$ of mineral water into the expanded preform. The volume $V_2$ is greater than $V_1$, but less than twice the volume $V_1$.

During the method of using the device described, the temperature of the preform is brought beforehand to a value between 50° C. and 130° C., or even between 75° C. and 100° C. In the preferred embodiment, this value is 95° C., the plastic used being PET.

The rod has a speed of between 0.5 and 3.0 m/s$^{-1}$, or even between 1.0 and 5 m/s$^{-1}$. In the preferred embodiment, this value is 1.6 m/s$^{-1}$.

The temperature of the beverage is brought beforehand to a value between 1° C. and 120° C., preferably between 10° C. and 90° C. In the preferred embodiment, this value is 30° C.

The longitudinal stretch ratio of the thermoplastic is between 2 and 5 or even between 2.5 and 4. In the preferred embodiment, this value is 3.5.

The radial stretch ratio of the thermoplastic is between 2 and 7, or even between 3 and 4.5. In the preferred embodiment, this value is 4.

The thermoplastic is chosen from the group consisting of polyethylene terephthalates, polypropylenes, polyethylenes, polycarbonates, polystyrenes, polylactic acids, polyvinyl chlorides and combinations thereof. In the preferred embodiment, it is PET.

The temperature of the mould is at least 50° C. below the melting point of the thermoplastic, which in the case of PET is 230° C. Preferably, this temperature is maintained below 100° C. In the preferred embodiment, the temperature of the mould is equal to the ambient temperature.

Of course, the invention is not limited to the embodiments described and illustrated by the appended drawings; rather it extends to all variants that can be envisaged by a person skilled in the art within the scope of the claims.

The invention claimed is:

1. A method of delivering a predetermined volume of a beverage component into a thermoplastic container formed from a heated preform positioned in a mold defining the shape of the container, the method comprising injecting a first volume of at least one beverage component into a recess in the preform so as to promote expansion of the preform inside the mold into the shape of the container, the first volume intentionally being greater than the predetermined volume, and removing a fraction of the first volume from the container resulting in a second volume of the at least one beverage component remaining in the container, the second volume being equal to the predetermined volume.

2. The method of claim 1, wherein the injection step includes longitudinally stretching the preform by a stretch rod, the stretch rod being hollow, and the removing step comprises removing out some of the beverage component via the hollow stretch rod.

3. The method of claim 1, comprising recirculating at least part of the beverage component removed during the removing step.

4. The method of claim 1, wherein the removing step comprises suction using a vacuum pump.

5. The method of claim 1, wherein the injection step comprises injecting the at least one beverage component through a hollow stretch rod that is designed to stretch a thermoplastic preform and is connected to a beverage inlet.

6. The method of claim 5, wherein the stretch rod injects the at least one beverage component and removes the fraction of the first volume.

7. The method of claim 6, wherein the stretch rod has a profile adapted to minimize the turbulence in a liquid during the step of injecting the first volume of the at least one beverage component via the hollow stretch rod.

8. The method of claim 7, wherein the profile includes an internal profile.

9. The method of claim 7, wherein the profile includes an external profile.

10. The method of claim 1, wherein the injection is performed using a bell-shaped filling head.

11. The method of claim 1, wherein the stretch rod is designed in such a way that its internal volume is optimized so that the fraction of the first volume is reduced.

12. The method of claim 11, wherein the fraction of the first volume is reduced to the internal volume of the neck.

13. The method of claim 1, wherein the injection step comprises injecting the first volume of the at least one beverage component through the inside of the stretch rod and through an orifice around the stretch rod.

14. The method of claim 1, wherein the injection step comprises a step of injecting a first beverage component and a step of injecting a second beverage component.

15. The method of claim 14, wherein the injection of the first beverage component comprises injection through the inside of the stretch rod and the injection of the second beverage component comprises injection through an orifice around the stretch rod.

16. The method of claim 1, wherein the at least one beverage component is injected with a stretch rod and an actuator that comprises two upper chambers filled with compressed air, and wherein a piston wall slides between the two upper chambers in a direction parallel to the stretch rod.

17. The method of claim 16, wherein the actuator further comprises a bottom chamber connected to a lateral inlet for the at least one beverage component.

* * * * *